United States Patent [19]
Kessler et al.

[11] Patent Number: 5,864,738
[45] Date of Patent: Jan. 26, 1999

[54] MASSIVELY PARALLEL PROCESSING SYSTEM USING TWO DATA PATHS: ONE CONNECTING ROUTER CIRCUIT TO THE INTERCONNECT NETWORK AND THE OTHER CONNECTING ROUTER CIRCUIT TO I/O CONTROLLER

[75] Inventors: Richard E. Kessler, Eau Claire; Steven M. Oberlin, Chippewa Falls; Steven L. Scott, Eau Claire, all of Wis.

[73] Assignee: Cray Research, Inc., Eagan, Minn.

[21] Appl. No.: 614,859

[22] Filed: Mar. 13, 1996

[51] Int. Cl.$^6$ .................................................. G06G 13/00
[52] U.S. Cl. ...................................... 395/200.69; 395/858
[58] Field of Search ................................ 395/558, 182.1, 395/200.3, 200.69, 858

[56] References Cited

U.S. PATENT DOCUMENTS

| Re. 28,577 | 10/1975 | Schmidt ................................... 179/15 |
| 4,330,858 | 5/1982 | Choquet .................................. 370/111 |
| 4,630,259 | 12/1986 | Larson et al. ............................ 370/60 |

(List continued on next page.)

FOREIGN PATENT DOCUMENTS

| 0353819A2 | 2/1990 | European Pat. Off. |
| 0475282A2 | 3/1990 | European Pat. Off. |
| 0460599A2 | 12/1991 | European Pat. Off. |
| 0460599A3 | 12/1991 | European Pat. Off. |
| 0473452A2 | 3/1992 | European Pat. Off. |
| 0479520A2 | 4/1992 | European Pat. Off. |
| 0501524A2 | 9/1992 | European Pat. Off. |
| 0570729A2 | 11/1993 | European Pat. Off. |
| 87/01750 | 9/1986 | WIPO . |
| 88/01341 | 8/1987 | WIPO . |
| 88/08652 | 4/1988 | WIPO . |
| WO95/16236 | 12/1994 | WIPO . |

OTHER PUBLICATIONS

"Deadlock–Free Routing Schemes on Multistage Interconnection Networks", *IBM Technical Disclosure Bulletin*, 35, pp. 232–233, (Dec., 1992).

"IEEE Standard for Scalable Coherent Interface (SCI)", *IEEE Std 1596–1992*, pp. 1–248 (Mar., 1992).

"Message Routing Systems for Transputer–Based Multicomputers", *IEEE Micro*, Jun. 13, 1993, No. 3, Los Alamitos, CA.

Adve, V.S., et al., "Performance Analysis of Mesh Interconnection Networks with Deterministic Routing", *Transactions on Parallel and Distributed Systems*, pp. 225–246, (Mar., 1994).

Bolding, K., "Non–Uniformities Introduced by Virtual Channel Deadlock Prevention", *Technical Report 92–07–07, Department of Computer Science and Engineering, FR–35 University of Washington; Seattle, WA 98195*, (Jul. 21, 1992).

Bolla, F.R., "A Neural Strategy for Optimal Multiplexing of Circuit–And Packet–Switched Traffic", *Department of Communications, Computer and Systems Science (DIST), University of Genoa*, pp. 1324–1330.

Boura, Y.M., et al., "Efficient Fully Adaptive Wormhole Routing in n–dimensional Meshes", *IEEE*, pp. 589–596, (Jun. 21, 1994).

(List continued on next page.)

*Primary Examiner*—Thomas C. Lee
*Assistant Examiner*—David Ton
*Attorney, Agent, or Firm*—Schwegman, Lundberg, Woessner and Kluth, P.A.

[57] ABSTRACT

A system and method of transferring information between a peripheral device and an MPP system having an interconnect network and a plurality of processing nodes. Each processing element includes a processor, local memory and a router circuit connected to the interconnect network, the processor and the local memory. Each router circuit includes means for transferring data between the processor and the interconnect network and means for transferring data between the local memory and the interconnect network. An I/O controller is connected to a plurality of the router circuits. Data is then read from the peripheral device and transferred through the I/O controller to local memory of one of the processing elements.

11 Claims, 10 Drawing Sheets

OTHER PUBLICATIONS

| | | | |
|---|---|---|---|
| 4,771,391 | 9/1988 | Blasbalg | 364/514 |
| 4,868,818 | 9/1989 | Madan et al. | 371/11 |
| 4,933,933 | 6/1990 | Dally et al. | 370/60 |
| 4,965,793 | 10/1990 | Polzin et al. | 370/94 |
| 4,974,143 | 11/1990 | Yamada | 364/200 |
| 4,980,852 | 12/1990 | Giroir et al. | 364/900 |
| 4,987,537 | 1/1991 | Kawata | 364/200 |
| 4,995,056 | 2/1991 | Fogg et al. | 375/7 |
| 5,008,882 | 4/1991 | Peterson et al. | 370/943 |
| 5,027,330 | 6/1991 | Miller | 365/239 |
| 5,031,211 | 7/1991 | Nagai et al. | 379/221 |
| 5,036,459 | 7/1991 | den Hann et al. | 364/200 |
| 5,068,784 | 11/1991 | Kishino et al. | 395/275 |
| 5,105,424 | 4/1992 | Flaig et al. | 370/94.1 |
| 5,157,692 | 10/1992 | Horie et al. | 375/38 |
| 5,161,156 | 11/1992 | Baum et al. | 371/7 |
| 5,170,482 | 12/1992 | Shu et al. | 395/800 |
| 5,175,733 | 12/1992 | Nugent | 370/94 |
| 5,195,100 | 3/1993 | Katz et al. | 371/66 |
| 5,218,601 | 6/1993 | Chujo et al. | 370/16 |
| 5,218,676 | 6/1993 | Ben-Ayed et al. | 395/200 |
| 5,233,618 | 8/1993 | Glider et al. | 371/68.1 |
| 5,239,545 | 8/1993 | Buchholz | 370/95.3 |
| 5,274,799 | 12/1993 | Brant et al. | 395/575 |
| 5,276,899 | 1/1994 | Neches | 395/800 |
| 5,280,474 | 1/1994 | Nickolls et al. | 370/60 |
| 5,303,244 | 4/1994 | Watson | 371/10.1 |
| 5,313,628 | 5/1994 | Medelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,345,565 | 9/1994 | Jibbe et al. | 395/325 |
| 5,347,450 | 9/1994 | Nugent | 395/200 |
| 5,353,283 | 10/1994 | Tsuchiya | 370/60 |
| 5,365,228 | 11/1994 | Childs et al. | 340/825.8 |
| 5,394,528 | 2/1995 | Kobayashi et al. | 395/325 |
| 5,402,428 | 3/1995 | Kakuta et al. | 371/10.1 |
| 5,412,782 | 5/1995 | Hausman et al. | 395/250 |
| 5,434,995 | 7/1995 | Oberlin et al. | 395/550 |
| 5,440,547 | 8/1995 | Easki et al. | 370/60 |
| 5,452,444 | 9/1995 | Solomon et al. | 395/182.04 |
| 5,499,377 | 3/1996 | Gordon | 395/182.04 |
| 5,513,192 | 4/1996 | Janku et al. | 371/50.1 |
| 5,517,497 | 5/1996 | LeBoudec et al. | 370/60.1 |
| 5,519,844 | 5/1996 | Stallmo | 395/441 |
| 5,522,031 | 5/1996 | Ellis et al. | 395/182.04 |
| 5,530,948 | 6/1996 | Islam | 395/182.04 |
| 5,546,549 | 8/1996 | Barrett et al. | 395/309 |
| 5,548,639 | 8/1996 | Ogura et al. | 379/221 |
| 5,555,524 | 9/1996 | Ogura et al. | 370/94.1 |
| 5,555,542 | 9/1996 | Shiojiri et al. | 348/387 |
| 5,566,321 | 10/1996 | Pase et al. | 711/153 |
| 5,574,849 | 11/1996 | Sonnier et al. | 395/182.1 |
| 5,581,705 | 12/1996 | Passint et al. | 395/200.13 |
| 5,627,986 | 5/1997 | Frankland | 395/402 |

OTHER PUBLICATIONS

Bundy, A., et al., "Turning Eureka Steps into Calculations in Automatic Program", *UK IT, (IEE Conf. Pub. 316)*, pp. 221–226, (1991).

Carlile, B.R., "Algorithms and Design: The CRAP APP Shared–Memory System", *Compcon Spring '93, San Francisco, CA*, pp. 312–320, (Feb. 22, 1993).

Chapman, B., et al., "Programming in Vienna Fortran", *Dept. of Statistics and Computer Science*, pp. 121–160.

Chien & J.H. Kim, A.A., "Planar–Adaptive Routing: Low–Cost Adaptive Networks for Multiprocessors", *Pro. 19th International Symposium on Computer Architecture*, pp. 268–277, (May, 1992).

Dally, W.J., et al., "Deadlock–Free Adaptive Routing in Multicomputer Networks Using Virtual Channels", *I.E.E.E. Transactions on Parallel and Distributed Systems*, vol. 4, No. 4, pp. 466–475, (Apr., 1993).

Dally, W., et al., "Deadlock–Free Message Routing in Multiprocessor Interconnection Networks", *IEEE Transactions on Computer, C–36*, pp. 547–553, (May, 1987).

Dally, W., "Performance Analysis of k–ary n–cube Interconnection Networks", *IEEE Transactions on Computers*, vol. 39, No. 6, pp. 775–785, (Jun., 1990).

Dally, W.J., "Virtual Channel Flow Control", *Pro. 17th International Sympsoium on Computer Architecture*, pp. 60–68, (May, 1990).

Debenedictis, E., et al., "Extending Unix for Scalable Computing", *IEEE*, pp. 43–53, (Nov., 1993).

Duato, J., "A New Theory of Deadlock–Free Adaptive Routing in Wormhole Networks", *I.E.E.E. Transactions on Parallel and Distributed Systems*, vol. 4, No. 12, pp. 1320–1331 (Dec., 1993).

Gallager, R., "Scale Factors for Distributed Routing Algorithms", *NTC '77 Conference Record 2*, pp. 2–1 through 2–5 (1978).

Glass, C.J., et al., "The Turn Model for Adaptive Routing", *Pro. 19th International Symposium on Computer architecture*, pp. 278–287, (May, 1992).

Gravano, L., et al., "Adaptive Deadlock–and Livelock–Free Routing with all Minimal Paths in Torus Networks", *IEEE Transactions on Parallel and Distributed Systems*, vol. 5, No. 12, pp. 1233–1251, (Dec., 1994).

Gupta, R., et al., "High speed Synchronization of Processors Using Fuzzy Barriers", *International Journal of Parallel Programming 19 (1990) Feb., No. 1, New York, US* pp. 53–73.

Gustavson, D.B., "The Scalable Coherent Interface and related Standards Projects", *IEEE Micro*, pp. 10–22, (Feb., 1992).

Ishihata, H., et al, "Architecture of Highly Parallel AP1000 Computer", *Scripta Technica, Inc.*, Systems and Computers in Japan 24, No. 7, pp. 69–76, (1993).

Jesshope, C. r., M.Y., "High Performance Communications in Processor Networks", *Communications in Processor Networks, Proc. 16th International Symposium on Computer Architecture* pp. 150–157, (May, 1989).

Kirkpatrick, S, G.V., "Optimization by Stimulated Annealing", *Science*, pp. 671–680, vol. 220, No. 4598, (May, 1983).

Linder, D.H., et al., "An Adaptive and Fault Tolerant Wormhole Routing Strategy for k–ary n–cubes", *I.E.E.E. Trans. on Computers*, vol. 40, No. 1, pp. 2–12, (Jan., 1991).

Lui, Z., et al., "Grouping Virtual Channels for Deadlock–Free Adaptive Wormhole Routing", *PARLE '93 Parallel Parallel Architectures and Languages Europe, 5th International PARLE Conference, Munich, Germany*, pp. 255–265, (Jun. 14–17, 1993).

MacDonald, T., et al., "Addressing in Cray Research's MPP Fortran", *Third Workshop on Compilers for Parallel Computers*, pp. 161–172 (Jul. 7, 1992).

Nuth, P., et al., "The J–Machine Network", *IEEE*, pp. 420–423, (1992).

O'Keefe, M.T., et al., "Static Barrier MIMD: Architecture and Performance Analysis", *Journal of Parallel and Distributed Computing No. 2.*, pp. 126–132, (Mar. 25, 1995).

Patterson, D.A., et al., "A Case for Redundant Arrays of Inexpensive Disks (RAID)", *University of California at Berkeley, Report No. UCB/CSD 87/391*, (Dec., 1987).

Scott, S., "The SCX Channel: A New, Supercomputer–Class System Interconnect", *HOT Interconnects III*, Abstract, pp. 1–11, (Aug. 1–11, 1995).

Shumway, M., "Deadlock–Free Packet Networks", *Transputer Research and Applications 2, NATUG–2 Proceedings of the Second Conference of the North American Transputer Users Group*, pp. 140–177, (Oct. 18–19, 1989).

Synder, L., "Introduction to the Configurable, Highly Parallel Computer", pp. 47–56, (Jan., 1982).

Talia, D., "Message–Routing Systems for Transputer–Based Multicomputers", *IEEE Micro*, vol. 13, No. 3, New York US, pp. 62–72, (Jun., 1993).

Wang, W., et al., "Trunk Congestion Control in Heterogeneous Circuit Switched Networks", *IEEE*, vol. 40, No. 7, pp. 1156–1161, (Jul., 1992).

Wu, M., et al., "DO and FORALL: Temporal and Spacial Control Structures", *Proceedings, Third Workshop on Compilers for Parallel Computers, ACPC/TR*, (Jul., 1992).

Yang, C.S., et al., "Performance Evaluation of Multicast Wormhole Routing in 2D Torus Multicomputers", *IEEE*, pp. 173–178, (1992).

Yantchev, J., et al., "Adaptive, low latency, deadlock–free packet routing for networks of processors", *IEE Proceedings*, vol. 136, Pt.E., No. 3, pp.136, 178–186 (May, 1989).

| CODE | NAME | DESCRIPTION |
|------|---------|-------------|
| 00 | EMPTY | REGISTER IS EMPTY. |
| 01 | FULL_F | REGISTER IS FULL, OPERATION FAILED BECAUSE OF AN ERROR. |
| 10 | FULL | REGISTER IS FULL, NO ERROR CONDITIONS OCCURRED. |
| 11 | FULL_SR | REGISTER IS FULL, SEND WAS REJECTED. |

FIG. 5

MASSIVELY PARALLEL PROCESSING SYSTEM USING TWO DATA PATHS: ONE CONNECTING ROUTER CIRCUIT TO THE INTERCONNECT NETWORK AND THE OTHER CONNECTING ROUTER CIRCUIT TO I/O CONTROLLER

BACKGROUND OF THE INVENTION

1. Field of the Invention

The present invention relates to massively parallel processors and in particular to a system and method for handling input and output in a massively parallel processor.

2. Background Information

Massively parallel processing (MPP) systems are computing systems comprised of hundreds or thousands of processing elements (PEs) individually interconnected by a common high-speed communication network. MPPs can be classified as either multicomputers or as multiprocessors. In a multicomputer MPP each PE is considered a stand-alone computer with its own central processor, local memory, and associated control logic. Each PE can only address its own local memory. It cannot directly read or write the local memory associated with another PE but instead must read data from another PE's memory by sending a message in an I/O-like packet to the target PE requesting that some data from its memory be formatted and sent back to the requesting PE, or vice versa for writes. Thus in a multicomputing system, each remote reference is essentially an I/O operation involving the target PE. This style of interprocessor communications is called "message passing." Message passing is a well-known and prevalent MPP programming model because multicomputers are relatively easy to build. The ease of construction of a multicomputer MPP arises from the use of commodity microprocessors in an environment that closely resembles their "natural habitat" (i.e., that hardware and software implementation envisioned by the microprocessor designers), that is, a network of small autonomous computers.

In a multiprocessor MPP, on the other hand, every PE can directly address all of memory, including the memory of another (remote) PE, without involving the processor at that PE. Instead of treating PE-to-remote-memory communications as an I/O operation, reads or writes to another PE's memory are accomplished in the same manner as reads or writes to the local memory. Therefore, multiprocessors have an ease-of-programming advantage over multicomputers.

A massively parallel processing system having attributes of both a multiprocessing and a multicomputing MPP is described in MULTIDIMENSIONAL INTERCONNECTION AND ROUTING NETWORK FOR AN MPP COMPUTER, U.S. Pat. No. 5,583,990 issued Dec. 10, 1996 by Birrittella, et al. That MPP system relies on a block transfer engine to perform data transfers without interrupting the local processor of the memory being read or written. In addition, prefetch message queues are used to prefetch data from remote locations whenever possible.

Such an approach addresses the problem of efficient transfer of data within the MPP system but does not extend these same efficiencies to the problem of communication between the MPP system and outside devices. The rate at which data can be transferred into and out of an MPP system is critical to the efficient use of the system. If communication between the outside world and the MPP system is too slow the MPP will only be useful in solving large scale problems (where the cost of loading the problem is dwarfed by the efficiencies of running on the MPP). In the MPP system described by Birrittella, et al., input and output from the MPP is handled through I/O gateways which transfer system data and control information between the host system and the MPP system. Like the regular processing nodes, each gateway can be used to transfer information to and from any processing element in the interconnect network. The I/O gateways are not, however, part of the toroidal mesh interconnect network. Instead they are attached as an appendage to processing nodes in two of the three interconnect dimensions.

Such an MPP system therefore has limited pathways from the outside world to the processing nodes of the MPP system. These limited pathways serve as a communications bottleneck which can throttle performance of the MPP system. What is needed is a system and method of transferring information into and out of an MPP system which overcomes this potential bottleneck.

SUMMARY OF THE INVENTION

The present invention is a system and method of transferring information between a peripheral device and an MPP system having an interconnect network and a plurality of processing nodes. Each processing element includes a processor, local memory and a router circuit connected to the interconnect network, the processor and the local memory. Each router circuit includes means for transferring data between the processor and the interconnect network and means for transferring data between the local memory and the interconnect network. An I/O controller is connected to a plurality of the router circuits. Data is then read from the peripheral device and transferred through the I/O controller to local memory of one of the processing elements.

Another aspect of the present invention is a massively parallel processing system having an interconnect network, a plurality of processing nodes and a plurality of I/O controllers. Each processing node includes a processor, local memory and a router circuit connected to the interconnect network, the processor and the local memory. Each I/O controller is connected to a plurality of router circuits and each router circuit includes means for transferring data between the processor and the interconnect network, means for transferring data between the local memory and the interconnect network and means for transferring data between an I/O controller and local memory of any of the plurality of processing nodes. The I/O controller can be connected to one or more peripheral devices.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which:

FIG. 5 is a table showing state codes associated with external registers;

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
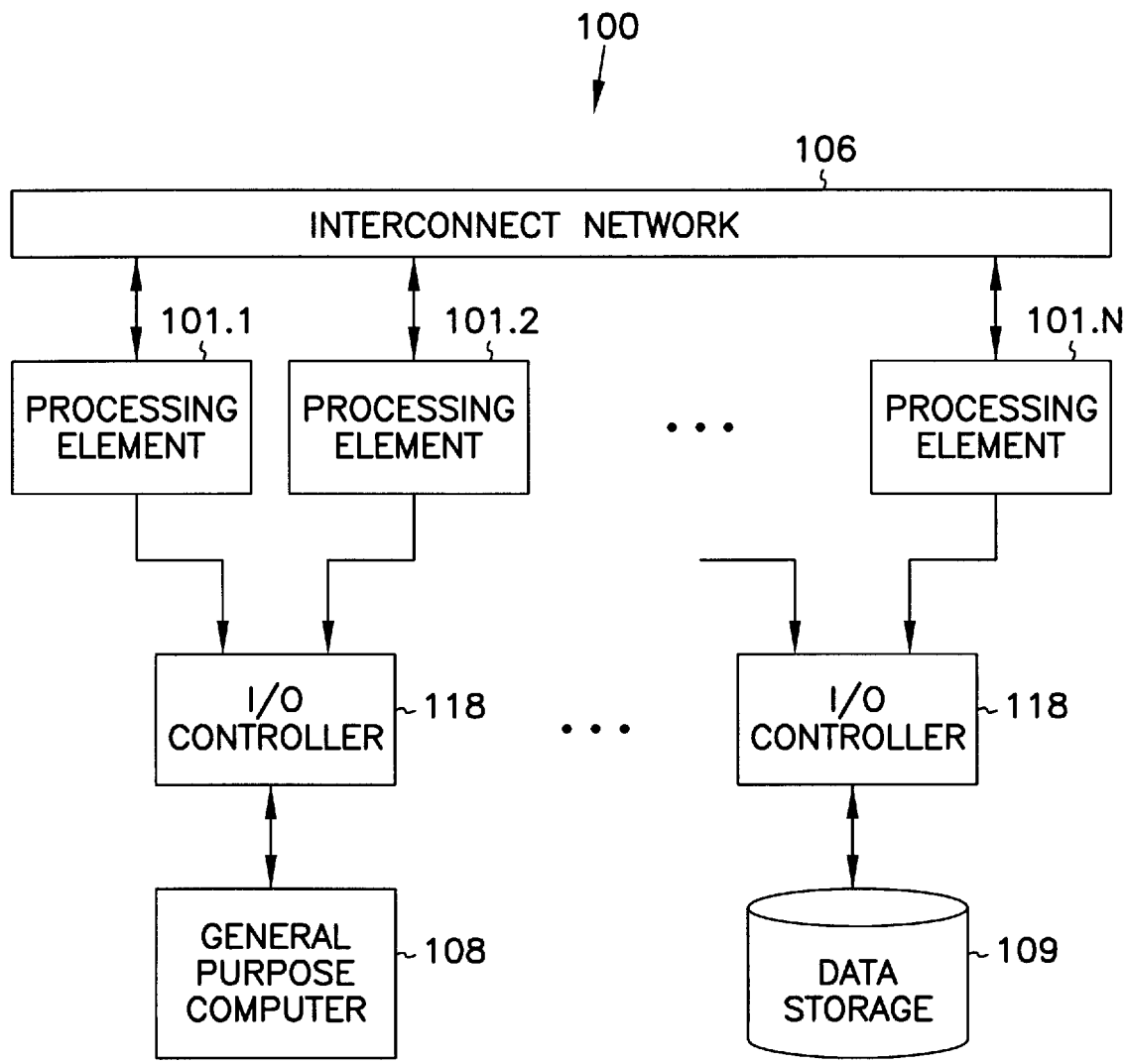
FIG. 1 is a simplified block diagram of a massively parallel processor system according to the present invention.

A simplified block diagram of a massively parallel processor system 100 is shown in FIG. 1. In FIG. 1 MPP system 100 contains hundreds or thousands of processing elements 101 linked via interconnect network 106. I/O controllers 118 are used to connect PEs 101 to peripheral devices such as general purpose computer 108 and data storage device 109.

Figure 2:
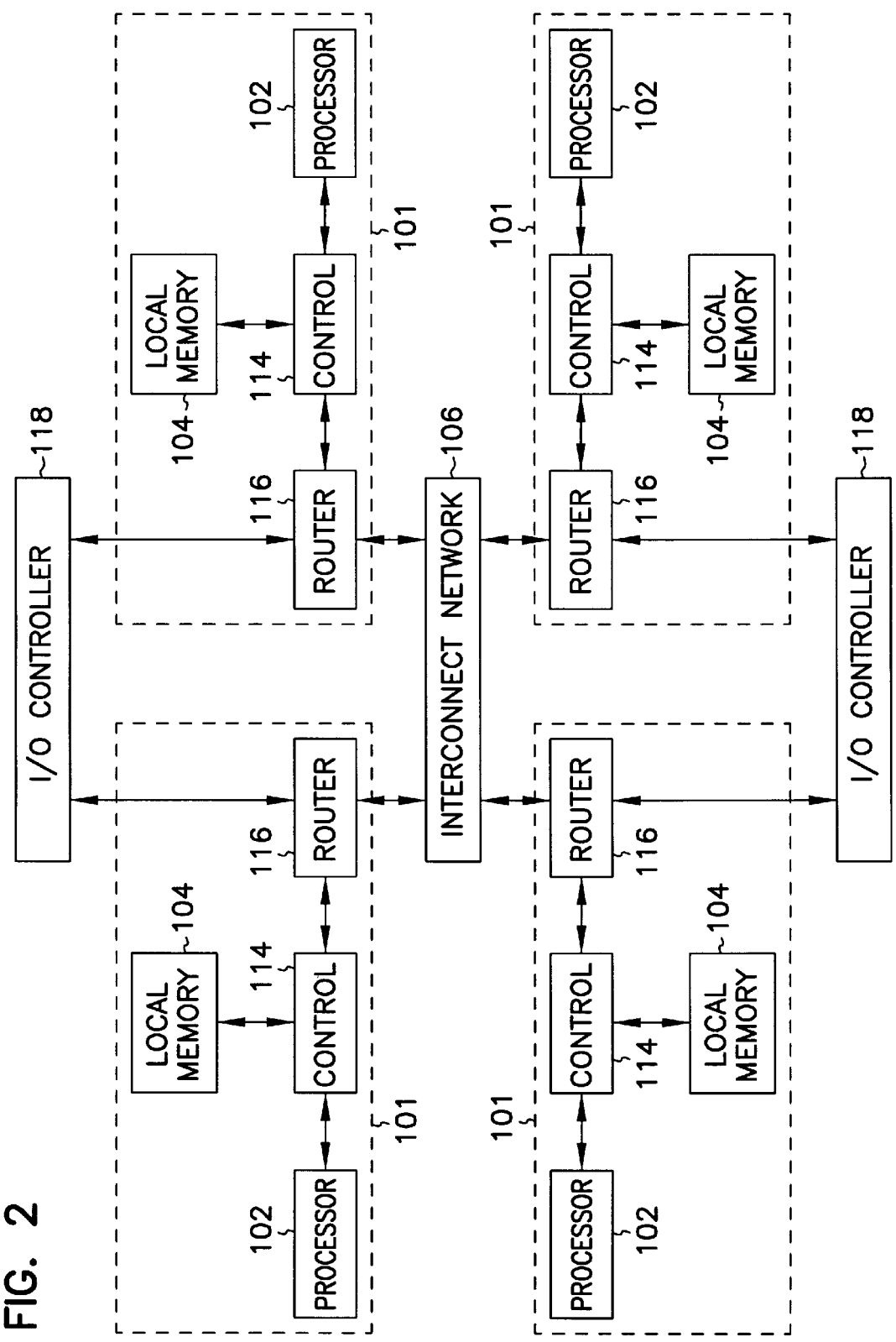
FIG. 2 is a more detailed block diagram of aspects of the massively parallel processor system of FIG. 1.

A more detailed block diagram of the MPP system of FIG. 1 is shown in FIG. 2. In the embodiment shown in FIG. 2, MPP system 100 is a MIMD massively parallel processing system with a physically distributed, globally addressable memory. MPP system 100 includes a large number of processing elements 101 connected to each other over an interconnect network 106. In addition, MPP system 100 includes I/O controllers 118 used to connect processing elements 101 to peripheral devices (such as general purpose computer 108 and data storage device 109 in FIG. 1). Each I/O controller 118 is connected to two or more processing elements 101. Bandwidth through each I/O controller 118 must therefore be sufficient to meet the aggregate demand of the PEs 101 attached to it.

Each processing element 101 includes a processor 102, a local memory 104, an interconnection network router 116 and a control circuit 114. Each processor 102 has a favored, low latency, high bandwidth path through control circuit 114 to a local memory 104, and longer latency, lower bandwidth access (via control circuit 114 and router 116) to the local memory 104 associated with other processors 102 over the interconnect network 106.

In one embodiment, control circuit 114 includes an external registers circuit such as that described in METHOD AND APPARATUS FOR EXTENDING MEMORY REFERENCE CAPABILITIES OF A MICROPROCESSOR, U.S. patent application Ser. No. 08/615,671, by Kessler et al., filed herewith, now pending, the description of which is hereby incorporated by reference. In one such embodiment, external registers within control circuit 114 are used to move data, including blocks of data, in an asynchronous (i.e., independent of the local processor) manner between processor 102 and remote memories 104 associated with other PEs 101 and between local memory 104 and remote processors 102 associated with other PEs 101. In addition, as is described in the Kessler et al. reference above, the external registers feature of control circuit 114 can be used to provide flexible addressing modes that permit a high degree of control over the redistribution of data between shared portions of the system memory.

Figure 3:
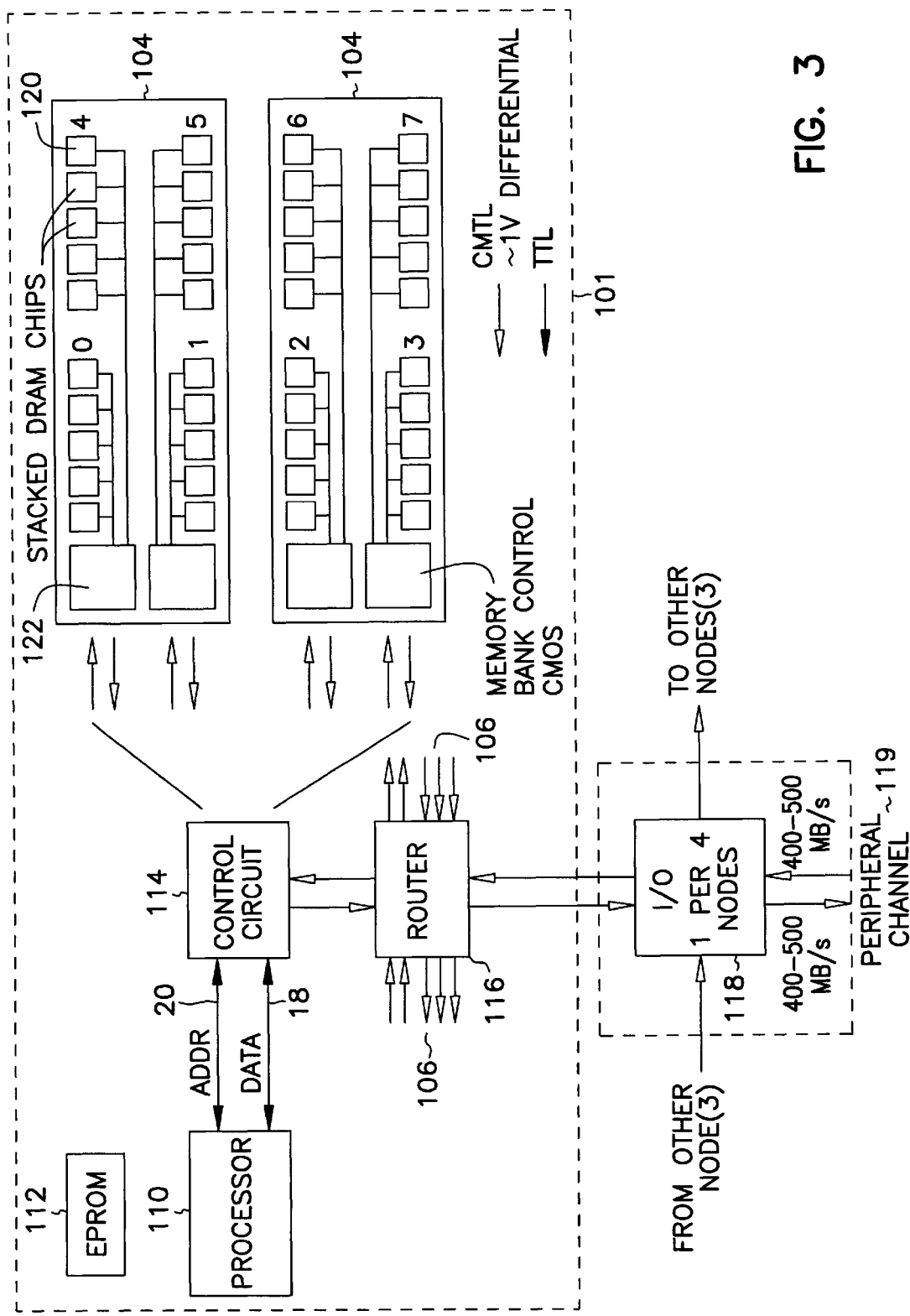
FIG. 3 shows a block diagram of a processing element (PE), including a processor, its associated shell circuitry, and local memory.

FIG. 3 shows a simplified block diagram of one embodiment of processor element 101. In this embodiment processor 102 is a high-performance RISC (reduced instruction set computer) microprocessor 110 such as the EV5 microprocessor or the EV56 microprocessor, both members of the DEC Alpha series of microprocessors available from Digital Equipment Corporation. (The EV5 microprocessor is sold as DEC P/N 21164 while the EV56 is sold as DEC P/N 21164A.) Each microprocessor 110 is coupled through control circuit 114 to a local memory 104 that is a distributed portion of the globally-addressable system memory. Local memories 104 may be formed, for instance, by stacking a plurality of DRAM integrated circuits 120 configured as banks of memory operating under control of memory bank controllers 122. Microprocessor 110 is also connected to a nonvolatile memory 112 used to store relatively unchanging information such as, for instance, boot program code.

In one embodiment, interconnect network 106 is a 3-dimensional torus which, when connected, creates a 3-dimensional matrix of PEs 101. The torus design has several advantages, including high speed information transfers and the ability to avoid bad communication links. A toroidal interconnect network is also scalable in all three dimensions. Interconnect networks of this nature are described in more detail in the following copending and commonly assigned U.S. patent applications: U.S. Pat. No. 5,533,198, entitled "DIRECTION ORDER ROUTING IN MULTIPROCESSING SYSTEMS", by Gregory M. Thorson, issued Jul. 2, 1996 and U.S. Pat. No. 5,701,416, entitled "ADAPTIVE ROUTING MECHANISM FOR TORUS INTERCONNECTION NETWORK", by Thorson et al., issued Dec. 23, 1997, now U.S. Pat. No. 5,701,416, both of which are incorporated herein by reference. Router 116 of FIG. 3 supports this three dimensional interconnect by providing an input path and an output path for each of the x, y and z dimensions. One embodiment of a message passing methodology which can be used advantageously in such a toroidal network is described in MESSAGING IN DISTRIBUTED MEMORY MULTIPROCESSING SYSTEM, U.S. patent application Ser. No. 08/615,694, by Kessler et al., now pending, filed herewith.

In the system 110 shown in FIG. 3, I/O controller 118 is connected to four processing elements 101 (only one is shown). I/O controller 118 connects in turn to one or more other devices over a high speed peripheral channel. One such high-speed channel is described in RECONFIGURABLE RING-BASED NETWORK SYSTEM, U.S. patent application Ser. No. 08/614,860, by Scott et al., now pending, filed herewith.

External Registers

As noted above, in certain embodiments microprocessor 110 is a commodity microprocessor such as the EV5 or the EV56 available from Digital Equipment Corporation. Commodity microprocessor implementations impose limitations on the types of application behaviors that can be supported efficiently. Control circuit 114 can be used to extend the capabilities of commodity microprocessor 110. One way for control circuit 114 to do that is illustrated in FIG. 4.

Figure 4:
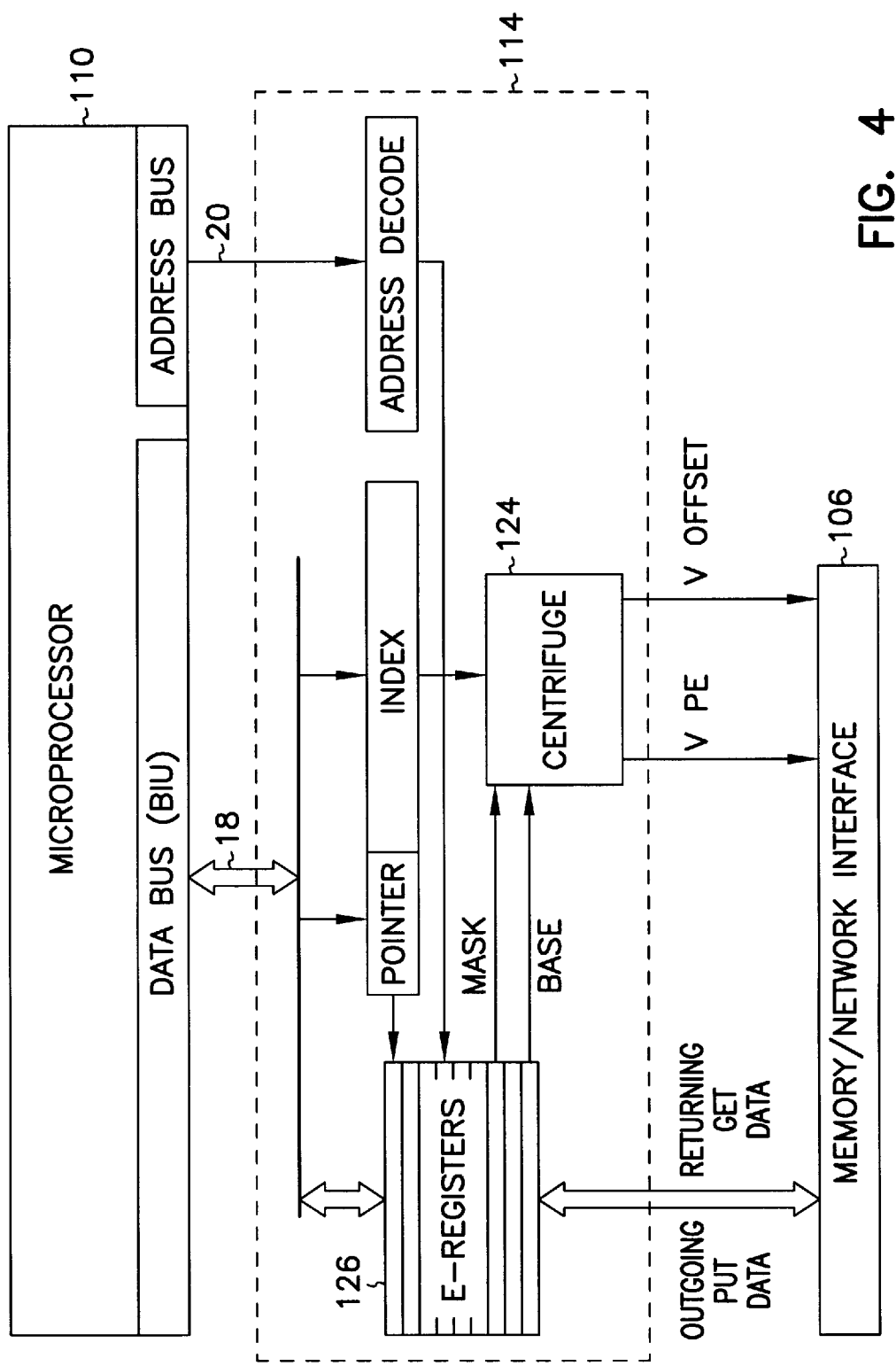
FIG. 4 shows a block diagram of a processing element (PE) having external registers and an address centrifuge.

In the PE 101 shown in FIG. 4, control circuit 114 includes a plurality of external registers (E-registers) 126. E-registers 126 are mapped directly into the memory space of MPP system 100. This provides high-bandwidth and low-latency load and store access to E-registers 126. In addition, in one embodiment, special memory-mapped store operations are used to provoke E-registers 126 to reference normal memory locations. These special operations include the ability to move data to/from E-registers 126 and memory locations in any of the local memories 104, to perform memory synchronization operations, initiate message transfers (to, for instance, other microprocessors), and to perform local operations that otherwise cannot be performed quickly within microprocessor 110. E-registers 126 serve as source or destination for additional operands and can be used to store the results of operations on operands supplied by microprocessor 110 or even for the results of operations on those operands previously stored in E-registers 126.

In one embodiment, where microprocessor 110 is a 64-bit microprocessor, E-registers 126 support fully-symmetrical 64 and 32-bit operations.

In typical microprocessor systems, transactions used to move data between the microprocessor and the external world contain both an address and data as part of the transaction. Most systems that use microprocessors use the address portion of the transaction to reference memory. With E-registers, the data portion can be used to address the memory instead. This has several advantages. First, this allows the addresses to be the full width of a data word (in the DEC Alpha series microprocessors the data word is 64 bits in length). Most physical addresses on microprocessors are smaller than this. Second, the available data bandwidth is typically higher than the available address bandwidth. This implies that more addresses can be issued more quickly when the addresses come out the data path. Finally, it allows the addresses to bypass the on-chip address translation mechanism, allowing the external system to supplement the address translation capabilities of the microprocessor.

In one embodiment, each E-register operation places information on both external data path 18 and external address path 20. The information placed on external address path 20 encodes not only the operation identifier but can also be used to designate the source and/or destination E-registers. The information placed on external data path 18 provides 64-bits of information that the E-registers interpret as address information. Most of this 64-bit address information encodes the particular memory location in memory 16 being accessed; thus, even if the microprocessor itself only supports a very small address range via the normal addressing path, E-registers 126 can support a much larger space (nearly 64-bits worth).

In one embodiment, other operands may be needed for a particular memory-mapped store operation. In such an embodiment, a small identifier may be included as part of the information placed on external data path 18 in order that the E-registers 126 associated with these additional operands can be identified. For instance, additional operands may be needed to support an "address centrifuge" data distribution translation that can be automatically performed on the rest of the address. Address centrifuging is described in U.S. Pat. No. 5,765,181 entitled "SYSTEM AND METHOD OF ADDRESSING DISTRIBUTED MEMORY WITHIN A MASSIVELY PARALLEL PROCESSING SYSTEM", issued Jun. 9, 1998 by Oberlin et al., the description of which is hereby incorporated by reference. Additional operands may also be required in order to provide synchronization primitive values or to provide a stride value required by vector operations. In one such embodiment, vector operations (on fixed-size vectors of length 8) can be used to efficiently support bulk data transfers, including memory-to-memory, memory-to-register, and register-to memory.

E-register operations may also be designed to take advantage of any performance enhancements due to spatial locality in the microprocessor; thus all E-register operations to sequential E-registers may result in merged references to a block of sequential addresses.

In one embodiment the basic operations supported by the E-registers include: load a vector from memory 104 to a block of E-registers 126, store a vector from a block of E-registers 126 to memory 104, load from E-register 126 to a register within microprocessor 110, and store from a register within microprocessor 110 to an E-register 126. In addition, the loads/stores between the E-registers 126 and memory 104 can optionally be centrifuged (e.g. by centrifuge 124) to accomplish automatic hardware data distribution. Address translation and protection checking can also performed during these operations.

In one embodiment, atomic memory synchronization operations are supported by the external registers of control circuit 114. In one such embodiment, the synchronization operations include: masked swap, compare-and-swap, get-and-add, and get-and-increment.

To load data from a memory location to an internal microprocessor register using an E-register 126, the application first issues a GET E-register command. Then later microprocessor 110 loads the data from an E-register 110 into a microprocessor register via a LOAD E-register command. The application can issue many GET's before it must LOAD the data since there are many E-registers (up to 1024 per context in the preferred embodiment). This allows for many outstanding memory system references.

To store data from the microprocessor to a memory location, the microprocessor first stores the data from the on-chip register to the E-register using a STORE E-register command. Then the application sends the data in the E-register to a memory location using a PUT E-register command. Hereafter, we use the terms LOAD and STORE when referring to transfers between the E-registers and the processor registers. Other operations like GET and PUT transfer data between E-registers 126 and memory 104.

E-register State Codes

In one embodiment, each E-register 126 has a state that the application can poll to determine that state of outstanding memory references. A representative set of states is listed in FIG. 5. When a GET has been issued but the data has not yet been deposited in the selected E-register 126, the state transitions to EMPTY. FULL indicates that register 126 is filled with useful data. FULL_F typically indicates that a GET operation failed, perhaps due to an out-of-bound memory reference. FULL_SR indicates that the register has useful data, but a prior SEND (a special "message send") failed because a message queue at a remote PE was full.

Accesses to E-registers 126 are implicitly synchronized by the state codes. An attempt to LOAD from an E-register 126 that is in state EMPTY stalls the LOAD until the E-register 126 is filled. In one embodiment, a plurality of execution modes are provided and, depending on the execution mode set by the application, a LOAD to a FULL_F E-register may cause an error interrupt. A LOAD from a FULL or FULL_SR E-register 126 returns the E-register data with no error.

In the embodiment shown in FIG. 5, two bits of E-register state code (ERS code) are provided for each E-register 126. In one such embodiment, E-register states 30 can be queried with an ERS_READ E-register operation. This command returns the 2-bit ERS codes for 32 adjacent E-registers 126. It can be used to determine if a GET has returned, for instance, though in the usual case the overhead of the ERS_READ outweighs its benefit. It is most useful for E-register context switching. The operation ERS_WRITE updates the ERS codes of a particular set of E-registers 126.

In one embodiment, the E-register states 30 are stored in a dual-ported RAM block which must be read (usually multiple times) for every E-register directed LOAD or STORE command. This RAM provides parallel access to multiple state code pairs on each reference. In one embodiment, each location in the RAM contains 32 state code pairs and a parity bit for a total of 65 bits. For a system having 640 E-registers 126, this RAM will be 20 lines deep.

In one embodiment, the RAM structure used to store the E-register state codes can accept a new read and a new write request every system clock and includes logic which detects when a read is being done from a location that is being simultaneously written. In that case, the read out data is bypassed and replaced with the write data to provide an up-to-date copy of the new value stored at that location in the same clock period. The read and write ports are arbitrated together since all references to the RAM require both a read and corresponding write operation.

In one embodiment, three special structures are provided to improve the apparent state code RAM read/write bandwidth. These are the ERS summary bits, the response flag merge and the request flag cache mechanisms.

The summary bits provide a low latency flag check for PUTs, E_REG LOADs and for Mask/Offset/Operand block (MOB) references. In one embodiment, each ERS summary bit represents the summarized state of a sixteen word block of E-registers; two summary bits are provided on each line of the E-register state code RAM. A summary bit will be true only if all the associated E-register words are in one of the two non-faulted FULL states. The individual bits are immediately updated each time the associated RAM line is modified.

The request flag cache is a one or more entry content addressable memory (CAM) used as a write-back cache of the RAM lines which have been most recently referenced during FULL flag checks associated with E-register directed operations emerging from processor 110. It serves to buffer FULL checks and EMPTY writes associated with processor 110 requests in order to reduce the possibility of contention with returning GET responses/updates.

ERS_READ and ERS_WRITE operations also go through this cache. Although ERS_WRITEs modify the entire line, a fall fetch of the specified line is first completed before the write proceeds so that no special sequencing is required for these operations. Likewise, an ERS_READ causes the ERS data being read to be brought into the cache in order to simplify sequencing control.

With the exception of MOB and LOAD related flag checks, a request-side miss in the cache for any reason will cause an immediate writeback of the displaced victim line and a simultaneous fetch of the new line. MOB and LOAD checks that miss will only result in a line replacement if the ERS summary flag test fails.

ERS writes on returning responses which hit in the cache are directed to the cache rather than the RAM (which will be updated later on a victim writeback). Response-side misses do not disturb the cache but rather update the RAM directly.

Response updates may be stalled for a period of time during victim writebacks but otherwise should proceed unimpeded.

EMPTY writes for outgoing E-register requests are requested simultaneously with destination flag reads. The write will not take place until the flags to be set EMPTY are all in a non-EMPTY state.

Whereas the ERS summary bit and ERS request flag cache mechanisms serve to reduce contention for state code RAM bandwidth from the requester side, the response flag merge logic attempts to group together individual ERS FULL writes (thereby enhancing apparent write bandwidth) for the returning responses. This is required since the worst case write bandwidth into the RAM is one ERS code per system clock period (assuming each ERS code update is to a different line) while the desired sustained E-register write bandwidth requires at least twice that. The merge buffer implementation must minimize latency for individual response updates where no contention is encountered while allowing ERS update writes which do contend to merge if they are to the same line. Thus, responses may continue to be written into the E_REG RAM even though the ERS write port may have begun to back up. Updates to the response flag require a read-modify-write sequence.

By accessing external memory through external registers 126 of control circuit 114, applications can access a very large address space, have many outstanding E-register memory references, manage bulk data transfers, and perform extended operations not directly supported by the microprocessor as well as additional multiprocessor synchronization and data-distribution primitives. All these enhancements increase the useability of the commodity microprocessor in a high-performance computing system.

In one embodiment of the systems shown in FIGS. 3 and 4, a memory location in the memory 104 local to a particular PE can be accessed in two ways: a direct (cacheable) load or store by the processor, or an indirect (non-cacheable) operation through E-registers 126. The virtual address used to access the memory location can be the same in both cases. Processor load and store instructions can reference only local memory. An on-chip DTB translates the virtual addresses to local physical addresses when the processor directly issues loads and stores. The shell circuitry translates the virtual address to a (either local or remote) physical address when the processor issues E-register GET and PUT references.

All direct loads and stores to memory are cacheable. All E-register references are non-cacheable. Since cacheable loads and stores can only reference local memory, cache coherence support is only required for the local cache relative to the local memory. Coherence will be maintained by using the back-map interface. The backmap contains a list of the physical addresses associated with the contents of a secondary cache kept within processor 110. (The primary cache contents are a subset of the secondary cache contents.) All E-register references consult the backmap before referencing the memory banks. If the referenced data could be in the secondary (or primary) cache, the shell circuitry initiates a transaction to withdraw the data from processor 110. The backmap address tags may be only partial tags; the tags need only be wide enough so that most E-register references that are not in the secondary cache do not unnecessarily probe processor 110. Our analysis suggests that the backmap tags need to be at minimum 8 bits wide for this.

In one embodiment, such as is shown in FIG. 4, control circuit 114 includes a hardware-implemented address centrifuge 124 used to convert a global address into a PE number and offset associated with a particular local memory 104. One such hardware-implemented address centrifuge is described in U.S. Pat. No. 5,765,181 entitled "SYSTEM AND METHOD OF ADDRESSING DISTRIBUTED MEMORY WITHIN A MASSIVELY PARALLEL PROCESSING SYSTEM", issued Jun. 9, 1998 by Oberlin et al., the description of which is hereby incorporated by reference. As noted above, an address centrifuge implementation distributes array data across local memories 104 of different processors 102. In the embodiment shown in FIG. 4 address centrifuge 124 is an integral part of the addressing path. The information necessary to generate the remote address comes from an index contained in a word written to the data path and from the centrifuge mask and base offset (extra arguments required to implement the address centrifuge). These arguments are stored in a block of E-registers 126 (the mask-offset block or MOB) indicated by a pointer field in the argument data. The centrifuge mask indicates the bits of the index that determine the processor element 101 where the memory location exists; the remaining bits determine the offset.

Use of an external address centrifuge eliminates the need for software centrifuging of remote addresses. The mask value read from the E-register indicated by the pointer field controls the centrifuge of the index. The base offset is added to the resulting offset that emerges from the centrifuge. Later, the resulting virtual offset is translated to a physical offset, and the virtual PE number is translated to a physical PE number.

Figure 6:
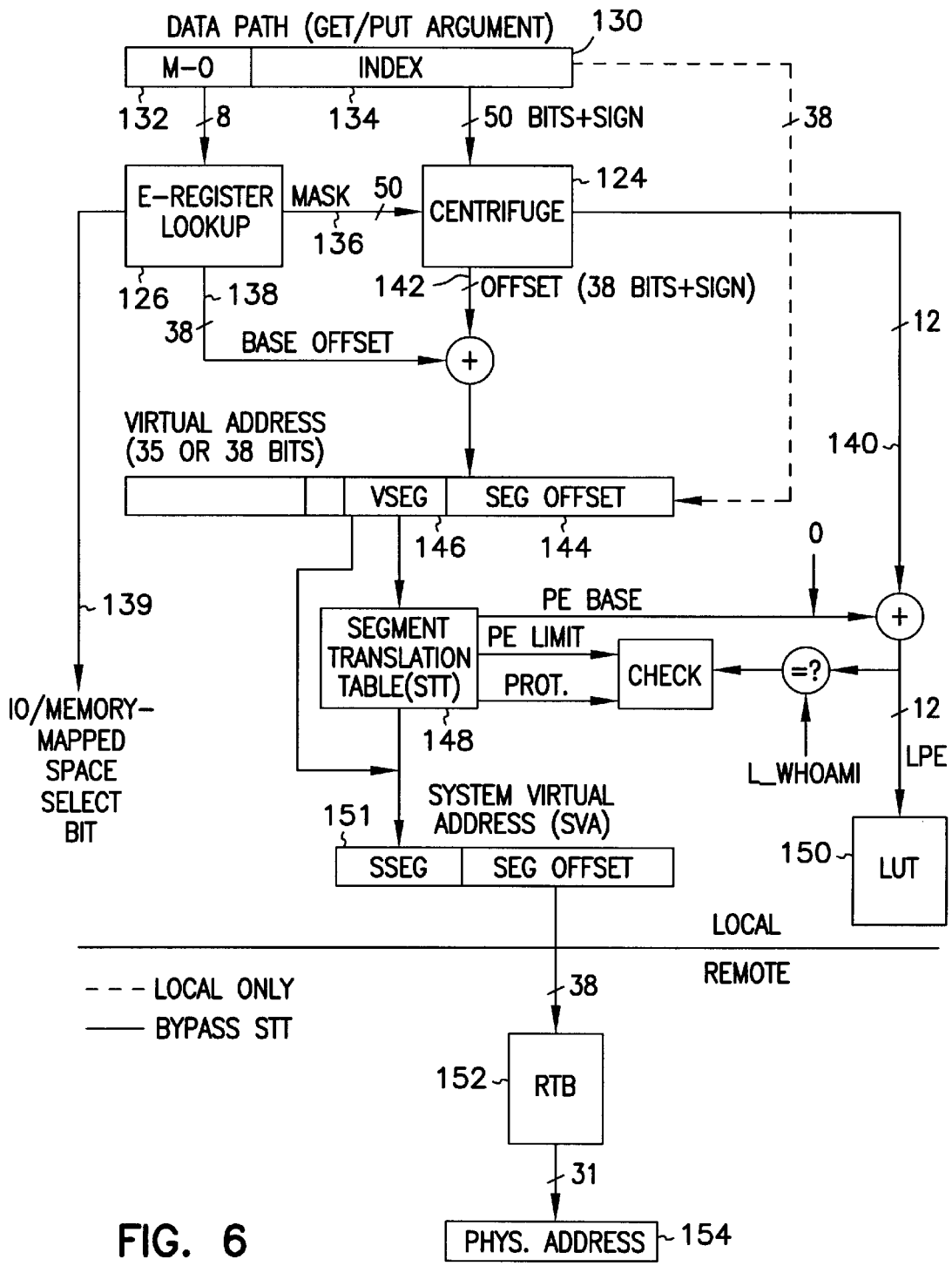
FIG. 6 is a more detailed depiction of one embodiment of the system of FIG. 4.

FIG. 6 is a more detailed depiction of one embodiment of the system of FIG. 4. On each E-register reference microprocessor 110 supplies a data word 130 to control circuit 114 via data bus 18. At around the same time, microprocessor 110 places an address on address bus 20 which indicates that an external memory reference is to occur. Data word 130 includes an MOB field 132 and an index field 134. MOB field 132 is used to select one or more E-registers 126. In one embodiment MOB field 132 is a four word block of E-registers 126. In one such embodiment, one of the MOB E-registers 126 contains a centrifuge mask word 136 previously stored by microprocessor 110. Another contains a base offset 138. Address centrifuge 124 takes centrifuge mask word 136 and index field 134 and generates a PE number 140 and an offset 142. Base offset 138 is added to offset 142 to produce a segment offset 144. In one such embodiment, as is shown in FIG. 6, index field 134 contains a signed integer.

An example of the address translation flow on an E-register reference will be discussed next. In a PUT or GET instruction which will result in a global memory reference (i.e., a reference to local memory 104 of a remote PE 101), an argument comes out of data path 18 which includes the MOB pointer 132. (The implementation may cache a certain number of MOBs rather than read them from the E-register file each time. A cache of just a few entries may be sufficient since only one base offset per array should be necessary.) Mask word 136 is supplied to address centrifuge 124 together with the signed index from index field 134. Centrifuge 124 produces two outputs—the virtual PE (VPE) of 12 bits (PE number 140) and the offset of 38 bits plus a sign (offset 142). Base offset 138 is added to offset 142 from centrifuge 124. That produces the final system segment (SSEG) offset that will be used to index into the appropriate SSEG.

E-registers 126 can also have a local-only addressing mode. This mode bypasses the centrifuge and address translation mechanisms; (local) virtual addresses (system or user) come directly out data path 18 as the PUT/GET argument; all PE translation is avoided, and there is no base offset add.

VSEG field 146 (from the sum of the base offset and the offset output of the centrifuge) indexes directly into a segment translation table (STT) 148 that, among other things, determines the SSEG corresponding to the given VSEG. Each STT entry contains four fields: PE Base, PE Limit, SSEG and PROT. The PE Base field and the PE limit field provide the PE protection for distributed segments, which are ignored in the local-only case. (The PE limit field indicates the maximum logical PE (LPE) number while the PE Base field is added to VPE to produce the LPE number.)

Since each VSEG has its own PE base and limits, each segment referenced by the user program can be distributed differently. For instance, this can enable segment sharing by multiple applications that run on different processors. The SSEG field contains the system segment corresponding to the given VSEG. The PROT field determines the access-rights that the user-program has for the segment indicated in the SSEG field. There will be separate protection rights to access the local portion of the distributed segment (if present), and any remote portions of the distributed segment. After determining if the resultant logical PE is local or not, the hardware will apply either the local or remote permissions. The permissions include read-only, read-and-write, and no-read-or-write.

In one embodiment, system software can bypass the STT translation mechanism. Special GETs and PUTs (usually accessible only by the system) will interpret bits 37–32 of the virtual address as a SSEG (rather than interpreting bits 34–32 as the VSEG). There are no STT protection checks on these references, and the PE base add function is disabled.

After the centrifuge operation and the STT lookup, the E-register request is ready to cross the network. A local PE identifier register (L_WHOAMI) contains the logical node ID of the local PE. By comparing the L_WHOAMI register to the LPE result of PE translation, the hardware determines if the reference is local or remote. If it is remote, the hardware sends the request over the network (by consulting LUT 150 for routing directions). The network request contains the SSEG that was extracted from the STT along with SSEG offset 144. The combination of the SSEG and SSEG OFFSET yields system virtual address (SVA) 151.

Translation from system virtual address to physical address occurs at the PE containing the physical memory being accessed. The system virtual address 151 (either produced by a local or remote GET or PUT) is converted into a physical address by means of a remote translation buffer (RTB) 152.

In one embodiment circuit 114 includes be an E-register request queue (E_QUEUE) capable of absorbing some number of E-register block writing (WRITE_BLOCK) requests. This is so processor 110 may proceed issuing E-register commands even though the external circuitry may not service the requests as fast as the processor is issuing them. An E-register request queue entry should include storage for the physical address bits that contain the command and target E-register pointer as well as storage for data arguments.

In one embodiment, E_QUEUE is a FIFO structure used to buffer multiple E-register directed commands. All processor 110 to E-register directed WRITE_BLOCK operations are enqueued in this FIFO as they emerge from processor 110. Only E-register LOAD and ERS_READ operations are not enqueued but instead are processed immediately.

In one embodiment, processor 110 LOADs from E-registers 126 are not processed until all prior E-register commands have been placed on the E_QUEUE (and thus have completed their own interrogation of the cache). In such an embodiment, LOAD related cache line allocation is guaranteed not to interfere with other ERS flag requester-side activities. MOB flag checks and source/destination flag checks do, however, contend with each other when both miss in the cache. In these cases, when both request new line allocations, the MOB will be allowed to go first.

The E_QUEUE structure consists of at least sixteen 86-bit words of RAM storage. Each 86-bit word in the single-read/single-write ported RAM consists of a 21-bit address/command field and a 64-bit data field and a parity bit.

E-register directed WRITE_BLOCK operations (commands) are placed in the E_QUEUE structure to be presented to an E_CMD request generation pipeline. Prior to entering the E_QUEUE, required E-register resources (MOB registers and data source or destination registers) are checked for availability and disqualifying error conditions. Assuming all resources are available, the E-register commands enter the E_QUEUE. They will subsequently be removed from the E_QUEUE by the E_CMD pipeline in the order in which they originally issued to the queue.

As a command arrives at the front of the E_QUEUE structure, it is examined by the E_CMD functional block to determine what type of request it is. Depending on the type of command, the E_CMD block must retrieve MOB values from the E-registers, perform address translation, check for access violations and either fetch data (for PUTs, SENDs, or atomic operations (A_OPs)) from the E-registers or store processor 110 sourced data to the E-register array.

In the preferred embodiment of circuit 114, GET's are allowed to issue speculatively. That is, memory range or permission errors do not trigger interrupts immediately; they instead put E-register 126 in state FULL_F which may later cause an interrupt. This allows GET's to issue in a loop, for example, prior to index testing for loop completion in order to allow the maximum data prefetch time. The E-register state may subsequently be changed from the FULL_F state by a legal GET, STORE, ERS_WRITE, or other operation.

To preserve the order of E-register operations, it is necessary for hardware to check the E-register state (ERS) code for target E-registers (and for those E-registers indicated by MOB field 132) prior to placing most E-register commands into E-register request queue E_QUEUE. If an E-register is EMPTY, and the command would set it EMPTY if it issued, it must first wait for the earlier operation to complete setting the register FULL again. If an E-register is a source of data for the operation, the E-register state code must be either FULL_SR or FULL or the operation will stall. The operation should be aborted (and appropriate error flags set), if a source E-register has been marked FULL_F.

Destination E-register state codes are set EMPTY as the command is accepted from the processor bus into E_QUEUE.

When a command reaches the head of the queue, it is not necessary to recheck the E-register state code for any operand E-registers: It is quite possible that some have been set EMPTY by commands that lie farther back in the queue, but until the later command actually reaches the head of the queue the data in the E-register remains intact.

Automatic merging of stores in processors such as the EV5 can be used to advantage. The automatic merging of stores in the EV5 write buffers allows multiple similar commands to be delivered to the trigger locations in a single bus cycle. In many cases, this capability can provide a four times improvement in data bandwidth for processor 110 transactions. Some E-register commands (e.g. GETV and PUTV) which act upon more than a single E-register require the E-register identifier to be right shifted in order for multiple commands to merge.

Messaging Facility

Special message packets can be sent via E-registers 126. In one embodiment, message queues stored in circuit 114 are generalized to be completely memory-mapped, allowing the creation of multiple queues by user or system code. Such an approach allows the user or system to define an arbitrary number of (user or system level) message queues; each can be of variable size and have selectable interrupt thresholds. Furthermore, each individual queue can start at any legal address and be any size (in one embodiment, however, queue sizes cannot exceed 64 MB). To do this, a control word is defined for each message queue. The control word describes the current state of the queue, including: the message queue size (limit), interrupt threshold, and the current queue position (tail).

Figure 7:
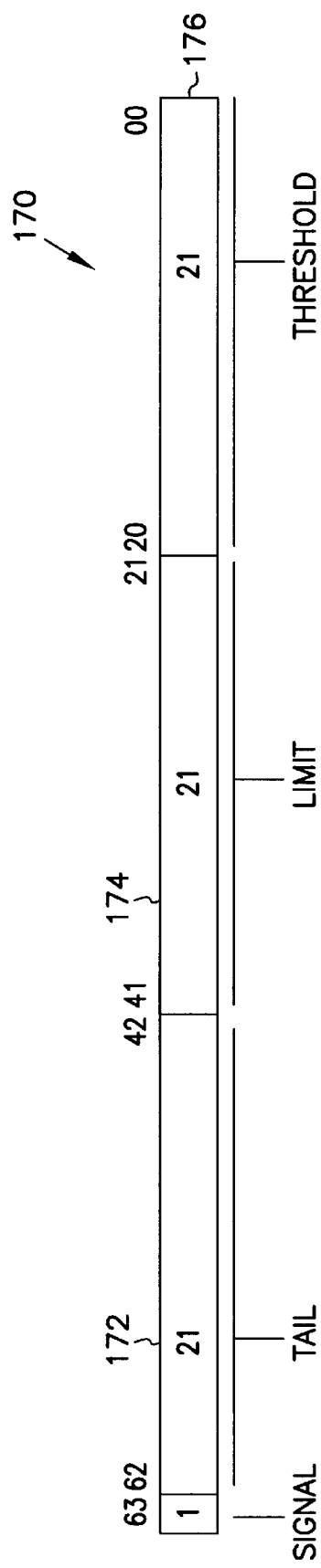
FIG. 7 shows a Message Queue Control Word used to control message traffic between processor elements.

In one embodiment, the SEND command sends 64-byte messages to a message queue residing at a predefined memory location. Messages are transmitted by first assembling the 64 bytes into an aligned block of eight E-registers and then issuing a SEND command. Many queues can exist simultaneously in memory. A message queue is created by constructing and storing a Message Queue Control Word (MQCW) 170 such as is shown in FIG. 7. FIG. 7 shows the fields in MQCW 170. Tail pointer 172 is a relative offset that is added to the address of the message queue control word to identify the tail of the queue (next available location). Tail pointer 172 is incremented by one as each message successfully arrives; it therefore has a granularity of 64 bytes. Tail pointer 172 should always be greater than 0 to avoid over-writing MQCW 170.

Limit 174 is a 21 bit value that indicates the top of the message queue. Sizes up to 128 MB are supported. Each time a message arrives, limit 174 is compared to tail pointer 172: if tail pointer 172 is greater than or equal to limit 174, the message is rejected and tail pointer 172 is not incremented.

Threshold 176 is a soft limit. As messages arrive and pass the limit test, tail pointer 172 is incremented and compared to threshold 176. If tail pointer 172 equals threshold 176, an interrupt is delivered to processor 110. Unlike the situation when tail pointer 172 is greater than or equal to limit 174, messages are not rejected when tail pointer 172 is greater than or equal to threshold 176.

One or more control words 170 are stored in local memory 104 of each PE 101. When a message arrives, the System Virtual Address (SVA) of control word 170 is added to tail pointer 172 to generate a new SVA for the message. The message SVA is checked for range errors prior to storing the message in the queue. If the store succeeds, an ACK response is returned to the sender. If the address is illegal, or there is a memory error while reading control word 170, a NACK containing error information is returned to the sender and the message store is aborted.

As the message exits the source E-registers, the ERS codes of the eight E-registers are set to empty. As the message successfully arrives in the destination queue, all eight source E-registers are set to the FULL state. If the message is rejected because the message queue is full, all eight source E-registers are set to FULL_SR. If, however, there was a range or memory error at the target message queue the eight source E-registers are set to FULL_F.

Each microprocessor 110 must maintain its own Head pointer to indicate the last message received (removed) from a message queue. This can be done in either hardware or software. To receive a message, the Head is added to the System Virtual Address of control word 170 and the message is retrieved from the resulting address with a GETV8 or direct cacheable load. Microprocessor 110 must compare tail pointer 172 with the head pointer for the message queue to determine when the queue has been emptied.

Note that since MQCW 170 exists in an arbitrary memory location in local memory 104, atomic memory operations can be used to update MQCW 170 and to manage the queues. In addition, the message queue control mechanism should be structured so that a processor initiated atomic operation on a control word 170 will exactly affect the flow of messages. For instance, if a swap is performed to redirect messages from one region of a message queue to another, the returned control word 170 should exactly represent the last message stored at the old region. No messages should be lost.

In one embodiment, message queue interrupt hardware captures the address of the control word 170 of the first message queue to signal a Threshold Exceeded interrupt. Hardware can also be used to record the fact that multiple queues have signalled Threshold Exceeded so that appropriate actions to service the additional interrupts can be initiated. An embodiment of the above-described message passing facility is described in "MESSAGING IN DISTRIBUTED MEMORY PROCESSING SYSTEM", U.S. patent application Ser. No. 08/615,694, filed herewith, now pending, the description of which is hereby incorporated by reference.

I/O Control

Two or more processor elements 101 are connected to each I/O controller 118. In one embodiment each I/O controller 118 contains a peripheral channel interface capable of sustaining a data bandwidth of approximately 300 MB/s concurrently in both the incoming and outgoing directions. The peripheral channels allow MPP system 100 to communicate directly with mainframes and peripherals having peripheral channel interfaces and, through channels adapters, to other networks such as HiPPi, Ethernet, FDDI, ATM, SCSI, etc. Since the standard peripheral channel is used for all I/O, system 100 requires only one type of bulkhead connector and one PE board type.

Figure 8:
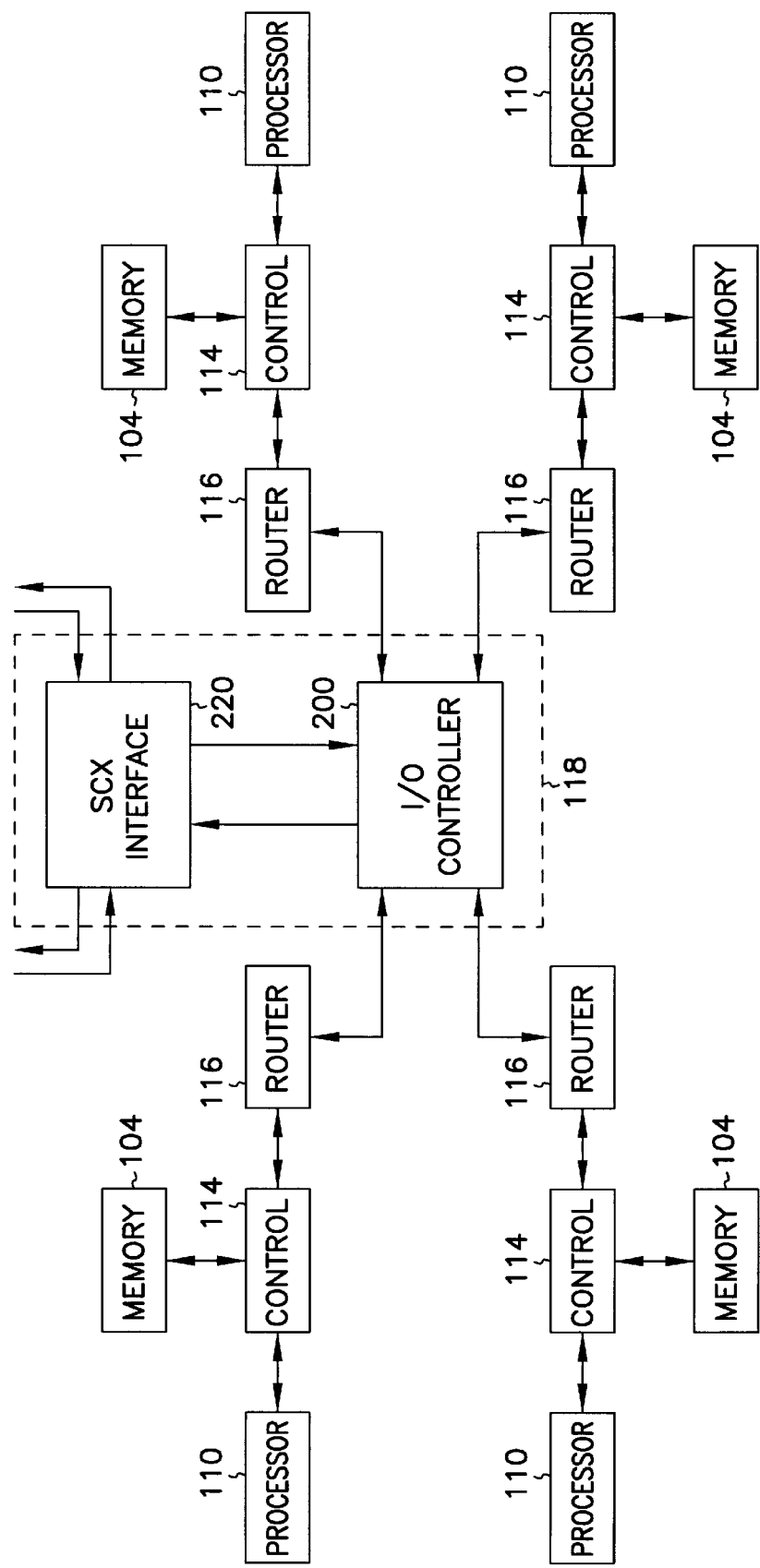
FIG. 8 shows one embodiment of a PE board having four PEs and one I/O controller according to the present invention.

In one embodiment, each MPP system 100 includes a plurality of PE boards. Each PE board includes an I/O Controller 118 connected to four PEs 101 (through routers 116). Such a configuration is shown in FIG. 8. Each I/O controller 118 includes a controller chip 200 and a peripheral channel interface 220. I/O channels are globally addressable, and may be controlled by the OS from any PE 101. That is, an I/O controller 118 has no special relationship with the four PEs to which it is connected.

Each processor 110 communicates with I/O devices connected to peripheral channel interface 220 via GETs, PUTs and SENDs to memory mapped register locations. Processor 110 initiates an I/O transfer by SENDing a transfer initiation message (TIM) to the appropriate I/O controller. GETs and PUTs are used for miscellaneous status-reading and for configuration of controllers. As in memory transfers, message transfers occur independently of the local processor 110.

Each controller chip 200 includes logic for sending and receiving messages, for acting as a slave to incoming direct memory access (DMA) requests and for acting as a master for up to two concurrent DMA transfers, one outgoing and one incoming. For instance, an I/O controller 118 notifies the operating system (OS) of certain events (such as an incoming message) by sending messages to an OS-designated PE 101. Controllers 118 also include buffering for both incoming and outgoing data. In contrast to processor elements 101, I/O controllers 118 issue GET and PUT packets directly rather than through an E-register circuit. (In effect, I/O controller 118 emulates the E-register message passing facility without the use of E-registers.)

All DMA transfers require a set of transfer registers that describe the length, address and local memory distribution of the transfer. These are provided by the MPP system 100 OS for DMA transfers that it masters and by an outside DMA master for transfers in which MPP system 100 is slave. (Even in the latter case, however, the register values may have been supplied originally by the system 100 OS.)

A separate MQCW 170 address is used for each type of TIM: outgoing messages, outgoing DMA transfers and incoming DMA transfers. TIMs for outgoing messages include a pointer to the message packet being transmitted. TIMs for incoming or outgoing DMA transfers include a set of transfer register values.

Upon receipt of a TIM, the I/O controller automatically transmits the outgoing message or performs the requested DMA transfer, optionally notifying the OS when done. Each I/O controller can buffer at least two TIMs for each MQCW 170. This allows additional I/O transfers to be "stacked up" at the controller behind a currently executing transfer, thus reducing the dead time between transfers.

During transfers, traffic from/to the I/O controller is distributed round-robin over the four paths to local routers 116. This minimizes interference with traffic on any one PE 101, and reduces the bandwidth requirement of the router-to-I/O-controller links, allowing them to be implemented with fewer wires. The OS can configure the I/O controller to skip any of these links for fault tolerance or performance reasons.

An I/O controller's network address is based on the address of any of its four neighboring PE's 101. An additional address bit specifies memory-mapped register space, which is split between routers 116 and I/O controller 118. This addressing scheme gives each I/O controller 118 four redundant network addresses, which allows the OS to dictate the PE 101 through which traffic to the I/O controller will be routed. Packets arriving at a router with the memory mapped register (MMR) bit set are either processed by the router 116 or sent to the local I/O controller 118, according to the register address included in the packet.

Figure 9:
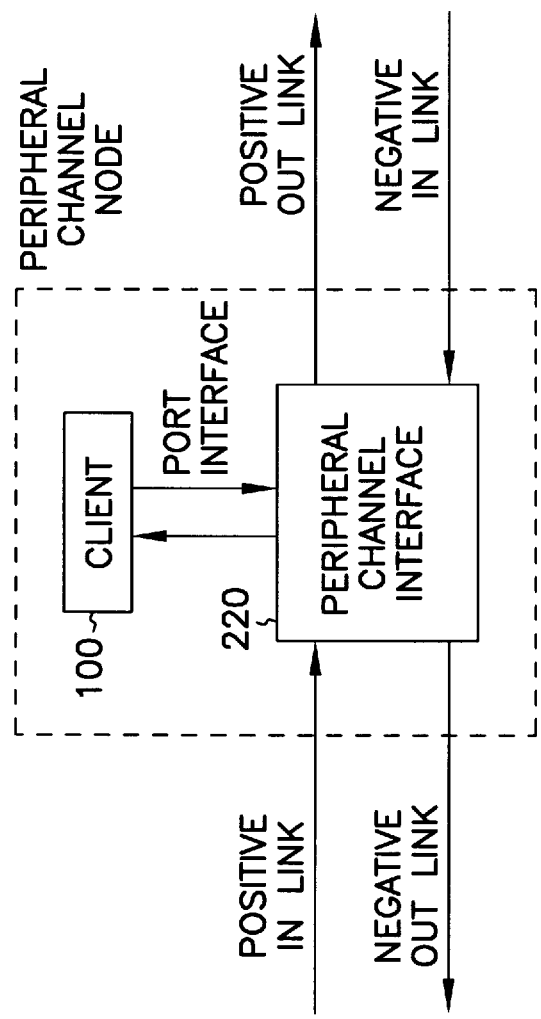
FIG. 9 shows a block diagram of an peripheral channel node.
Figure 10:
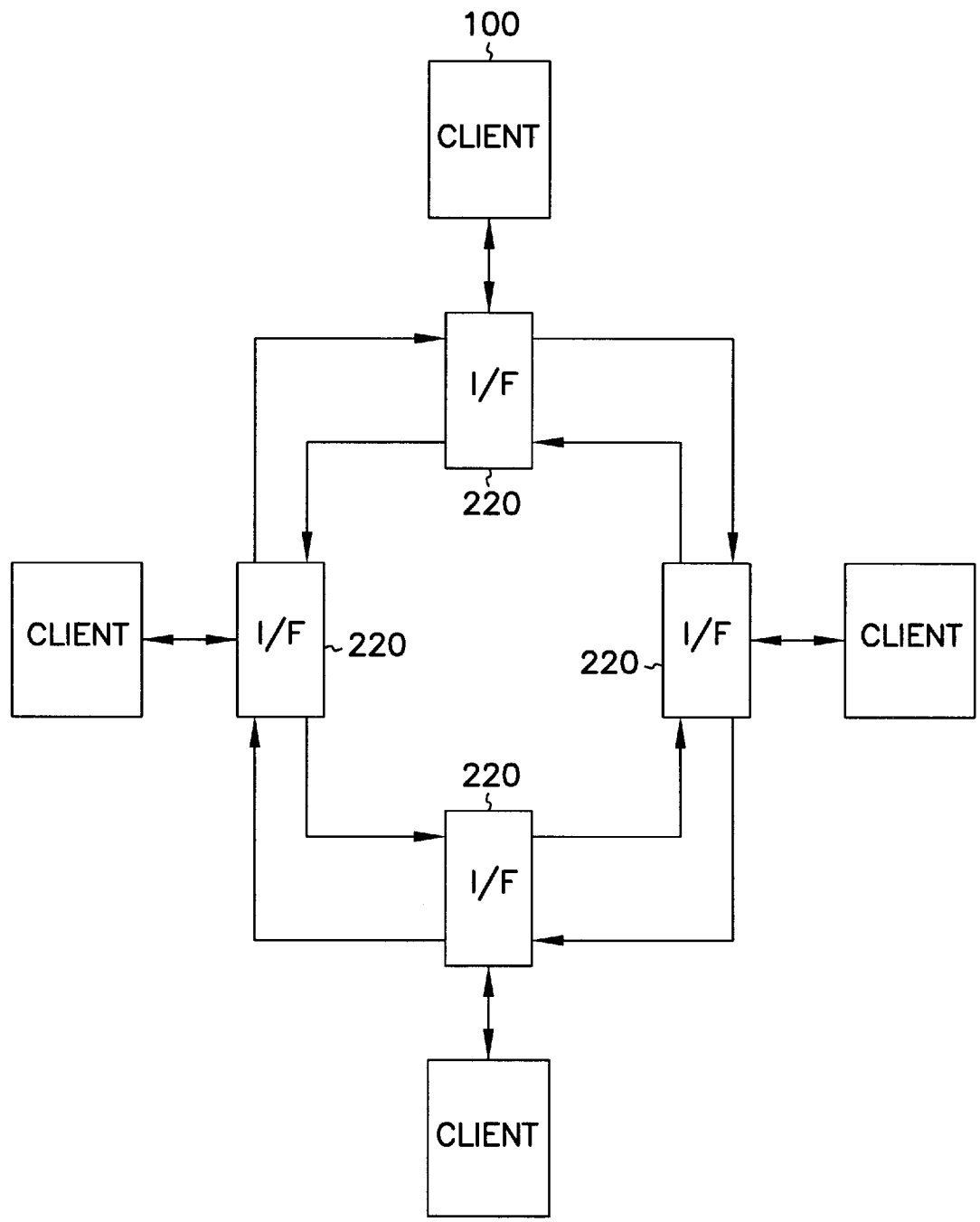
FIG. 10 shows a block diagram of a four node peripheral channel implementation.

Before discussing the operation of the I/O controller, it is useful to review the functionality provided by the standard peripheral channel. In one embodiment, the peripheral channel is a ring-based interconnect that scales easily from a single, point-to-point connection to a ring with many nodes. Systems having peripheral channel interfaces can simply be connected together to form a ring, with no intermediate switches, allowing full connectivity between all nodes. In one embodiment, the peripheral channel is implemented as a pair of unidirectional, counter-rotating rings in order to provide redundancy and flexible reconfiguration. A basic diagram of one embodiment of a peripheral channel node is shown in FIG. 9. In this figure, the client can be considered to be the rest of system 100. Nodes are linked together to form a ring as shown in FIG. 10.

Peripheral channel clients communicate with each other by transmitting packets across the client port. Packets are comprised of some number of 4-byte symbols. Flow control between the client and the peripheral channel interface is performed on a symbol-by-symbol basis. The channel implements separate virtual channels for request and response packets in order to avoid deadlock.

The peripheral channel patent application defines an I/O protocol to be used by all peripheral channel clients. The protocol provides two basic capabilities: peer-to-peer messaging and DMA. Peer-to-peer messages allow short (up to 32 words), unsolicited data exchanges with no target buffer reservations. DMA allows one client to directly read or write arbitrary blocks of data in another client's memory.

The peripheral channel packet includes a 16-byte header containing peripheral channel nodeIDs for the target and source, a packet command, a sequence number, special packet control information, flow information used only by the channel, and a client address. A data payload of 1 to 32 64-bit words may optionally be included. Peripheral channel packet types are differentiated by their command values. The MsgPkt is used for peer-to-peer messages. Longer messages can be implemented either by breaking them up into multiple MsgPkts, which then must be reassembled, or by pre-arranging buffer locations and using DMA operations.

A device on a peripheral channel ring may read from or write to the memory in another device on the peripheral channel ring using DMA transfers. DMA is performed through ReadBlk and WriteBlk operations. ReadBlk operations allow a DMA master to read data directly from a DMA slave's memory without OS intervention. The ReadBlkInit is required to pre-negotiate transfer speed and because certain clients require knowledge of the whole transfer before the individual read operations occur.

After receiving the ReadBlkInitResp, the DMA master performs a series of Reads, receiving the data in ReadResps. When all ReadResps have returned, the master signals completion via a ReadBlkDone, and the slave may clear any state it might have associated with the transfer. Some additional processing and/or notification will likely take place at this point. For example, if an external device were doing a ReadBlk in response to an OS generated I/O request, it may now write the data out to a peripheral or network and then notify the OS via a peer-to-peer message.

WriteBlk operations are handled similarly to ReadBlk operations. The WriteBlkInit is used to negotiate an initial transfer speed and set up any necessary state in the slave. The master performs a series of Writes, and counts the returned WriteResps. A WriteResp indicates only that the Write was received, not necessarily that the data has been fully written into the slave's memory. When all WriteResps have been received, the master sends a WriteBlkDone. The slave sends the WriteBlkDoneResp to indicate that all previous Writes have completed locally.

Read and Write commands can operate on data sizes between 1 and 32 64-bit words. The data size is specified via a 5-bit subfield within the Command field of the packet. All packet addresses refer to aligned 64-bit quantities.

Memory-mapped register requests (MMR_Read and MMR_Write) are used for accessing peripheral channel status and configuring the peripheral channel. Client maintenance packets (MaintRead and MaintWrite) packets are used to perform maintenance on remote peripheral channel clients. Aside from a handful of predefined functions, the addresses and side effects of maintenance packets are client-specific.

The I/O controllers on MPP system 100 provide access to all peripheral channel functionality. Any PE 101 can send an peripheral channel message to a destination peripheral channel client. To send a message on an peripheral channel, the operating system (OS) first places the message in a memory 104 and then sends a transfer initiation message (TIM) to the outgoing-message-MQCW 170 of the desired I/O channel. The TIM contains a pointer to and length of the outgoing message. In one embodiment, microprocessor 101 of one of the PEs 101 stores an peripheral channel packet in local memory 104. Microprocessor 110 then stores message-send request parameters into a contiguous block of E-registers 126 (E-registers 126 serve as the source registers for a SEND command). In one embodiment, a logical PE number, a global address value and a packet length are loaded into E-registers 126. The logical PE number indicates the logical PE where the peripheral channel packet is stored. The global address value indicates the location of the peripheral channel packet in local memory 104 of that logical PE 101. The message is assumed to be stored stride one in a single PE's memory. The length field indicates the total number of 64-bit words in the packet. In one embodiment, the length must be between 2 and 34, inclusive, and represents the number of words in the message, including header. Microprocessor 110 then issues a SEND E-register command to the outgoing message queue register of one of the I/O controllers 118. The selected I/O controller 118 sends the peripheral channel packet to the destination client on the peripheral channel and then sends an acknowledge for the E-register SEND command back to the requesting PE 101.

In one embodiment, I/O controller 118 has an outgoing message queue that can store up to eight outgoing peripheral channel message-send requests in addition to the peripheral channel message-send request currently being processed. I/O controller 118 processes message-send request in the order received. If the outgoing message queue is full, I/O controller 118 sends a no-acknowledge for the E-register SEND command back to the requesting PE 101. This changes the E-register state code for the source E-registers 126 to the full-and-send-rejected (FULL_SR) state. The requesting PE can then send the message-send request to another I/O controller 118.

The contents of the outgoing message are not modified, save for the packet's Source ID. Thus, the message sending facility can actually be used to send any type of peripheral channel packet. OS software could use this mechanism, for example, to issue peripheral channel memory-mapped register requests, or to send maintenance packets to other clients. The corresponding response packets are provided back to software via incoming messages.

Any PE 101 can receive an peripheral channel message packet from an peripheral channel client. On an incoming message, each I/O controller 118 maintains a window (contained in a single PE's memory) where it places the incoming MsgPkts. This window is specified in advance via PUTs to controller memory mapped registers by the OS.

Upon receipt of MsgPkt from the peripheral channel, controller 118 writes the contents of the packet's data payload into the next "slot" in the message window and advances its write pointer in the window by 32 words. Thus, each MsgPkt consumes 32 words of the message window, regardless of actual size. The only exception to this are zero-payload MsgPkts (which convey information only in the message header). No payload is stored for these messages.

In one embodiment, an I/O controller 118 receives a peripheral channel message packet from a peripheral channel client. The I/O controller 118 determines how many 64-bit words are in the message payload of the peripheral channel packet. If the packet length is one or more words, the I/O controller determines whether there is room in a reserved location of system 100 memory for storing peripheral channel message payloads. If there is room, I/O controller 118 stores the payload into local memory 104 of one of the PEs 101.

Once the PUT responses for the data payload have been received, I/O controller 118 sends an OS-designated PE a SEND packet containing the 16-byte header of the received packet and a pointer to the packet's payload in memory. The OS can then process the packet header and consume the packet payload as desired. In one embodiment, the header of the packet is forwarded to microprocessor 110 of a PE 101 (not necessarily the same PE 101 where the payload was stored) via a SEND E-register command. After receiving the header information, microprocessor 110 reads the message length, logical PE number, global address value and peripheral channel packet header out of its message queue. Microprocessor 110 uses this information to process the packet header and to locate the message-packet payload.

If the message window is full or has not been established, then I/O controller 118 sends an appropriate error message to the OS and blocks further MsgPkt input from the peripheral channel until the OS has responded.

Certain other incoming peripheral channel packets are also placed in the message window by I/O controller 118. These include corrupt packets (these packets have been delivered by the peripheral channel marked as corrupt and are therefore unreliable), peripheral channel MMR response packets, client maintenance response packets, and other packets that I/O controller 118 does not recognize.

A PE 101 can act as a DMA master or a DMA slave. To initiate a WriteBlk operation as DMA master, the OS sends a TIM to the WriteBlk MQCW of the desired I/O controller 118. The TIM contains a pointer to a WriteBlkInit packet and a set of transfer register values describing the distribution in memory of the data to be transferred out the peripheral channel.

The WriteBlkInit packet is sent over the peripheral channel to the DMA slave. It provides the slave with the transfer length, base address, and optional slave-specific information. If the slave is another system 100, for example, the WriteBlkInit must include the transfer register values for the slave PE 101 memory distribution.

The DMA slave returns a WriteBlkInitResp packet accepting or refusing the WriteBlk. If it is refused, I/O controller 118 sends an error message to the OS. If accepted, the WriteBlkInitResp includes a new slave base address, which is subsequently used by the I/O controller 118 mastering the transfer. The first peripheral channel Write packet includes this address, and the address in each subsequent peripheral channel Write packet is incremented by 32 words.

The transfer register values included in the TIM are stored in the I/O controller 118 and used to retrieve data for the outgoing transfer. The registers include the transfer length, stride, starting index, base address and mask.

I/O controller 118 issues a series of GET8s or GETV8s (the vector form is used for aligned, stride-one blocks that do not straddle PEs) to read the data from memory 104. The GET8 (GETV8) addresses are generated by centrifuging index 134 with mask 136 and adding base address 138 (which includes a base PE). After each GET8 (GETV8) the index is incremented by 1 (8) times the stride.

The data from GET responses is assembled into 32-word peripheral channel Write packets and sent to the DMA slave over the peripheral channel. A shorter Write packet is used at the beginning and/or end of the transfer for non-multiple-of-32 length transfers. The initial Write address is that returned from the salve in the WriteBlkInitResp, and successive Write addresses are incremented by 32 (or as appropriate for short packets). That is, all WriteBlk transfers appear as stride one over the peripheral channel from system 100's perspective.

Once I/O controller 118 has received WriteResp packets for each Write packet it sent, it sends the slave a WriteBlk-Done packet. Upon receipt of the corresponding WriteBlk-DoneResp packet, the I/O controller notifies the OS of transfer completion via a SEND packet, and is then free to process another outgoing DMA request. WriteBlk operations that do not complete for some reason must be timed out by the OS or outside entity; I/O controller 118 does not maintain a hardware timer.

ReadBlk DMA transfers are initiated in much the same way as WriteBlk transfers. The OS sends a TIM to the ReadBlk MQCW of the desired I/O controller 118. The TIM contains a pointer to a ReadBlkInit packet and a set of transfer register values describing the distribution in memory for the incoming data.

The ReadBlkInit packet is sent over the peripheral channel to the DMA slave. It provides the salve with the transfer length, base address, and optional slave-specific information.

The DMA slave returns a ReadBlkInitResp packet accepting or refusing the ReadBlk. If it is refused, I/O controller 118 sends an error message to the OS. If accepted, the ReadBlkInitResp includes a new slave base address, which is subsequently used by the I/O controller 118 mastering the transfer. The first peripheral channel Read packet includes this address, and the address in each subsequent peripheral channel Read packet is incremented by 32 words.

The transfer register values included in the TIM are stored in the I/O controller 118 and used to store data associated with the transfer into memory 104 as it arrives off the peripheral channel. The registers include the transfer length, stride, starting index, base address and mask.

I/O controller 118 sends a series of peripheral channel Read packets to the slave over the peripheral channel, receiving payload-bearing ReadResp packets in return. The first Read packet uses the slave base address returned in the ReadBlkInitResp and subsequent Read packets increment this address by 32. Non-multiple-of-32 transfers cause an initial and/or trailing short Read packet.

As ReadResp packets are received over the peripheral channel, I/O controller 118 stores the data into memory 104 using PUT8 or PUTV8 packets (as appropriate). The sequence numbers returned in the ReadResp packets are used to index into the transfer. The I/O controller multiplies the stride by the number of words into the transfer, adding that to the transfer's starting index, and then centrifuges the resulting index. The multiplication is necessary because the requested data may not be returned in sequential order. A full-length ReadResp packet is split into 32 PUT8 packets or 4 PUTV8 packets, the address for each of which is centrifuged separately.

Once the I/O controller has received PUT responses for all the data it wrote into memory 104, it sends the slave a ReadBlkDone packet and notifies the OS of transfer completion via a SEND packet. It is then free to process another ReadBlk DMA request from the OS. ReadBlk operations that do not complete for some reason must be timed out by the OS or outside entity.

The peripheral channel allows DMA masters to directly read and write memory of DMA slaves. The slave need only respond to incoming Read and Write packets, each of which carries its own address. Due to the centrifuged memory distribution, however, system 100 must keep state associated with each active DMA operation for which it is a slave. The state is used to index into the transfer and apply the correct centrifuge operation(s) to each incoming request packet.

System 100 maintains an implementation-defined number of register sets, used to hold state for incoming DMA transfers. When a ReadBlkInit or WriteBlkInit packet is received, a check is made to see if a register set is free. If no register set is free, the DMA operation is refused via the BlkInitResp. This should happen very infrequently, as a large number of register sets will be implemented.

Incoming ReadBlkInit and WriteBlkInit packets for system 100 include an auxiliary data block and contain the transfer length, starting index, stride, base PE, base offset and centrifuge mask. These values are saved in a free incoming transfer register set. The I/O controller then returns a new slave base address to the DMA master in the ReadBlkInitResp or WriteBlkInitResp. This address encodes the register set number in the high-order bits and is zeroed in the low-order bits.

Upon subsequent receipt of an peripheral channel Read or Write packet, the high order bits of the address are used to identify the appropriate incoming transfer register set, from which the starting index, stride, mask, base pe and base offset are extracted. I/O controller 118 then generates the local memory address by multiplying the Read or Write address by the stride, adding it to the starting index, centrifuging it using the mask and finally adding the resulting address to the base pe and offset.

The controller then performs the requested action, either reading data from memory or writing data to memory. A fill-sized (32 word) peripheral channel Read or Write packet is broken up into a collection of GET8, GETV8, PUT8 and/or PUTV8 packets. The vector forms are used for aligned, stride-one blocks of references that do not straddle PEs.

Upon receipt of all GET responses from memory, a ReadResp packet containing the requested data is returned to the DMA master. WriteResp packets are returned immediately, but a count of all outstanding PUTs is maintained for each incoming transfer register set.

Upon receipt of a peripheral channel ReadBlkDone packet, the associated incoming transfer register set is freed, and a WriteBlkDoneResp packet is returned to the DMA master. Upon receipt of a peripheral channel WriteBlkDone packet, I/O controller 118 waits for all outstanding PUTs associated with the corresponding transfer to complete and then responds to the peripheral channel DMA master with a WriteBlkDoneResp packet. The transfer register set is then freed.

In one embodiment, I/O controller 118 does not notify the OS upon completion of a slave DMA transfer. This is left to the DMA master, if it so chooses.

Outgoing maintenance traffic (initiated by the OS) is sent via the messaging facility. In one embodiment, I/O controller 118 also has the capability of responding to client maintenance traffic targeted at system 100 from another client on the peripheral channel.

There are four types of maintenance packets to which system 100 will respond: scan control, "construct-a-command", loopback testing and peripheral channel client MMRs. I/O controller 118 distinguishes between various maintenance functions via the address contained in the MaintRead or MaintWrite packets.

Scan control packets are accepted only at the scan master I/O controller 118. Scan operations are performed by a series of MaintWrite packets to the proper scan control address. The results of the boundary scan are placed into a memory-mapped buffer on the I/O controller and can be accessed by MaintRead packets to the appropriate address.

"Construct-a-command"s allow an outside agent to create arbitrary internal packets. The packet is passed, in its entirety, in the payload section of a MaintWrite packet addressed to the construct-a-command MMR address. Any response to the constructed command is returned over the peripheral channel in a MaintWriteResp packet.

The construct-a-command feature is used, for example, to create necessary SPUTs and SGETs while booting system 100 over the peripheral channel. The peripheral channel prevents any node without ring master permissions from sending client maintenance packets.

In one embodiment, I/O controller 118 include loopback testing features which can be used to test parts of the I/O controller or other external systems.

There are a handful of client MMRs defined by the peripheral channel, such as a WHOAMI register that can be used by the peripheral channel master to determine what clients are attached to a given peripheral channel. The OS can access these requests as needed.

Although the present invention has been described with reference to the preferred embodiments, those skilled in the art will recognize that changes may be made in form and detail without departing from the spirit and scope of the invention.

What is claimed is:

1. A massively parallel processing system, comprising:
    an interconnect network;
    a plurality of processing nodes, wherein each processing node includes:
        a processor;
        local memory; and
        a router circuit connected to the interconnect network, the processor and the local memory, wherein the router circuit includes first and second data paths, wherein the router circuit transfers data between the processor and the interconnect network and between the local memory and the interconnect network over said first data path; and
    a plurality of I/O controllers, including a first I/O controller, wherein each I/O controller is connected to the second data path of a plurality of the router circuits and wherein each router circuit further includes I/O routing means for transferring data between the I/O controller to which the router circuit is connected and local memory of any of the plurality of processing nodes.

2. The system according to claim 1 wherein one of the local memories includes a first memory location and wherein the router circuit further includes an external registers circuit, wherein the external registers circuit includes:
    a plurality of external registers connected to the processor via a data bus;
    an address translator for calculating, based on an index written to the data bus, an address associated with the first memory location; and
    transfer means, connected to the plurality of external registers, for transferring data between the first memory location and one of the plurality of external registers.

3. The system according to claim 2 wherein the router circuit further includes an integrated address centrifuge.

4. The system according to claim 1 wherein the I/O routing means includes means for forwarding to the I/O controller a message packet received by the router circuit.

5. A massively parallel processing system, comprising:

an interconnect network;

a plurality of processing nodes, wherein each processing node includes:
  a processor;
  local memory; and
  a router circuit connected to the interconnect network, the processor and the local memory, wherein the router circuit includes first and second data paths, wherein the router circuit transfers data between the processor and the interconnect network and between the local memory and the interconnect network over said first data path;

a peripheral device; and a plurality of I/O controllers, including a first I/O controller, wherein each I/O controller is connected to the second data path of a plurality of the router circuits and wherein each router circuit further includes I/O routing means for transferring data between the I/O controller to which the router circuit is connected and local memory of any of the plurality of processing nodes a plurality of I/O controllers, including a first I/O controller, wherein each I/O controller is connected to a plurality of router circuits, wherein each router circuit further includes means for transferring data between the I/O controller to which the router circuit is connected and local memory of any of the plurality of processing nodes and wherein the first I/O controller includes peripheral interface means for transferring data from the peripheral device to the local memory on one of the plurality of processing nodes.

6. The system according to claim 5, wherein the peripheral interface means includes a serial channel connected to the peripheral device and to one of the plurality of I/O controllers.

7. The system according to claim 5 wherein one of the local memories includes a first memory location and wherein the router circuit further includes an external registers circuit, wherein the external registers circuit includes:

a plurality of external registers connected to the processor via a data bus;

an address translator for calculating, based on an index written to the data bus, an address associated with the first memory location; and transfer means, connected to the plurality of external registers, for transferring data between the first memory location and one of the plurality of external registers.

8. The system according to claim 7 wherein the router circuit further includes an integrated address centrifuge.

9. The system according to claim 5 wherein the I/O routing means includes means for forwarding to the I/O controller a message packet received by the router circuit.

10. A method of transferring data between a peripheral device and a massively parallel processing system having an interconnect network and a plurality of processing nodes, wherein each processing node includes a processor, local memory and a router circuit connected to the interconnect network, the processor and the local memory, wherein the router circuit includes a first and a second data path, wherein the router circuit transfers data between the processor and the interconnect network and between the local memory and the interconnect network over said first data path:

providing an I/O controller;

connecting the I/O controller to the second data path of a plurality of router circuits;

reading data from the peripheral device;

transferring the data read from the peripheral device from the I/O controller to one of the plurality of router circuits connected to the I/O controller; and transferring the data read from the peripheral device from the one of the plurality of router circuits connected to the I/O controller across the interconnect network to the local memory of one of the plurality of processing nodes.

11. The method according to claim 10, wherein the step of reading includes the steps of formatting a packet containing the data read from the peripheral device and sending the packet over a serial channel to the I/O controller.

* * * * *